(12) United States Patent
Roberts et al.

(10) Patent No.: US 6,573,726 B1
(45) Date of Patent: Jun. 3, 2003

(54) SENSITIVE GROUND FAULT DETECTION SYSTEM FOR USE IN COMPENSATED ELECTRIC POWER DISTRIBUTION NETWORKS

(75) Inventors: Jeffrey B. Roberts, Viola, ID (US); Daqing Hou, Pullman, WA (US); Hector Altuve-Ferrer, Nuevo Leon (MX)

(73) Assignee: Schweitzer Engineering Laboratories, Inc., WA (US)

( * ) Notice: Subject to any disclaimer, the term of this patent is extended or adjusted under 35 U.S.C. 154(b) by 0 days.

(21) Appl. No.: 09/563,178

(22) Filed: May 2, 2000

(51) Int. Cl.[7] ............................................... G01R 31/14
(52) U.S. Cl. .......................... 324/509; 361/76; 361/77
(58) Field of Search ................... 324/512, 522, 324/525, 509; 361/42, 43, 46, 47, 48, 110, 2–14, 76, 77, 82, 84, 44

(56) References Cited

U.S. PATENT DOCUMENTS 4,674,002 A * 6/1987 Li et al. ........................ 361/66
5,455,776 A * 10/1995 Novosel ....................... 364/492
5,694,281 A * 12/1997 Roberts et al. ............... 361/80
6,229,679 B1 * 5/2001 Macbeth ....................... 361/42

* cited by examiner

*Primary Examiner*—Safet Metjahic
*Assistant Examiner*—Etienne LeRoux
(74) *Attorney, Agent, or Firm*—Jensen & Puntigam, P.S.

(57) ABSTRACT

A system for detecting ground faults in a compensated electric power distribution network includes the determination of zero sequence voltage ($V_O$) and zero sequence current ($I_O$) on a power line and calculating the zero sequence conductance ($G_O$) therefrom. The operation of the conductance calculation circuit occurs only under selected power line conditions involving minimum values of zero sequence voltage, zero sequence current and positive sequence voltage, to ensure the accuracy of a fault direction determination. The conductance values are processed on an adaptive basis in which the difference between the most recent conductance value and a conductance value from a selected previous point in time is determined and then compared against threshold values to make forward and reverse fault declarations.

31 Claims, 2 Drawing Sheets

SENSITIVE GROUND FAULT DETECTION SYSTEM FOR USE IN COMPENSATED ELECTRIC POWER DISTRIBUTION NETWORKS

TECHNICAL FIELD

This invention relates generally to ground faults in compensated electric power system distribution networks, and more specifically concerns a system for detecting such ground faults which has high sensitivity but which requires information only from the protected power line and which uses generally known power line constants.

BACKGROUND OF THE INVENTION

Medium voltage power distribution systems (greater than 1 KV) typically are grounded in some manner. System grounding involves a number of operational issues and effects, including the minimizing of voltage and thermal stresses on equipment, compliance with personnel safety standards, avoidance of communication system interference and helping in the rapid detection and subsequent clearing (elimination) of ground faults, i.e. faults which occur between one phase of the three-phase power line and ground.

It has been estimated that 80 percent of all power system faults in a medium voltage distribution network are single phase-to-ground faults. Such ground faults have a number of potentially serious effects, depending upon the particular system used for grounding. These effects can include a significant hazard to human safety; thermal stress on the equipment due to the presence of the fault current from the faulted phase; voltage stress, which could be both transient and sustained; interference with telecommunications, and a disruption of power to customers in the area of the fault served by the faulted feeder.

Different grounding systems are used in different countries. The more common types of grounding include isolated neutral, where the neutral point has no intentional connection to ground, i.e. the system is connected to ground through distributed line-ground capacitance. Countries using the isolated neutral system include Italy, Japan and Russia. Solid grounding systems are characterized by the power system neutral points being connected to earth, with no intentional impedance between neutral and earth. Great Britain uses a unigrounding type of solid grounding, while the USA, Canada, Australia and Latin America use a multi-grounding solid grounding system. France and Spain utilize a low impedance grounding system, in which the system is grounded through a low impedance resistor or reactor. For high impedance grounding systems, grounding is obtained through a high impedance resistor or reactor.

Still other countries use a resonance grounding approach. Resonance grounding systems include a reactor which is generally tuned to the system phase-to-ground capacitance. This reactor is a coil, generally referred to as a Petersen coil. Those power systems using resonance grounding are also sometimes referred to as compensated power systems.

Resonance grounding systems restrict the magnitude of ground fault current and reduce many of the significant problems of ground faults, with the possible exception of voltage stress. Some of the other systems, like the solid grounding (multigrounding) system, without any impedance between the neutral and the earth, have some operational advantages, but large magnitudes of fault current occur with a ground fault. The occurrence of a ground fault in such systems requires immediate interruption to prevent/minimize the risk to human safety and to avoid other problems. Fast interruption of the faulted line, even for temporary faults, is important.

The major disadvantage to the power systems which restrict the magnitude of ground fault current, such as the compensated power systems, is the problem of ground faults being difficult to detect because of low magnitude fault current. Actual phase-to-ground faults can thus go undetected for a considerable time. The power system can continue to operate, however, with little risk to human life. It is still desirable, however, that a ground fault be detected, because a second fault located elsewhere on the system does permit large magnitude fault currents to flow. Ground faults are typically easier to detect in those systems which produce large magnitude fault current when a ground fault occurs, but such faults must be detected quickly; the fault current moreover must be interrupted as soon as possible, by interrupting service to the faulted portion of the line.

Accordingly, it is desirable to have a ground fault detection system which has the required sensitivity to detect high resistance (very low fault current) ground faults for use with resonant grounded power systems, but which is also practical in its implementation. Further, it is desirable for such ground fault detection system to use only information (current and voltage) from the protected line, since such a system can be used outside of a substation.

DISCLOSURE OF THE INVENTION

Accordingly, the present invention is a system and method for detecting ground faults in a power distribution network, including the determination of zero sequence voltage ($V_0$) and zero sequence current ($I_0$) quantities present on a protected power line and the calculation of a conductance value from the $V_0$ and $I_0$ quantities. The calculation is enabled by enabling circuits only under selected power line conditions to insure the accuracy of a ground fault determination. The conductance-related value is then compared against a first threshold value to determine a forward fault and a second threshold value to determine a reverse fault.

BEST MODE FOR CARRYING OUT THE INVENTION

As discussed above, one of the most advantageous grounding techniques for power distribution networks involves the use of a reactor tuned to the system phase-ground capacitance. Such a reactor, in what is referred to as a resonant grounding system, is known as a Petersen coil. It is also known as an arc suppression coil or, in some cases, a ground fault neutralizer. The Petersen coil can be connected to the neutral of a distribution transformer, or a grounding transformer, and ground. A power system using resonant grounding is also referred to as a compensated power distribution system.

When the inductance of the Petersen coil substantially equals the phase-ground capacitance of the power system, the system is referred to as fully compensated, or 100 percent tuned. If the coil inductance does not match the capacitance of the system, the system is "off-tuned". It can be either over or under-compensated, depending upon the magnitude of the coil inductance relative to the system capacitance.

Figure 1:
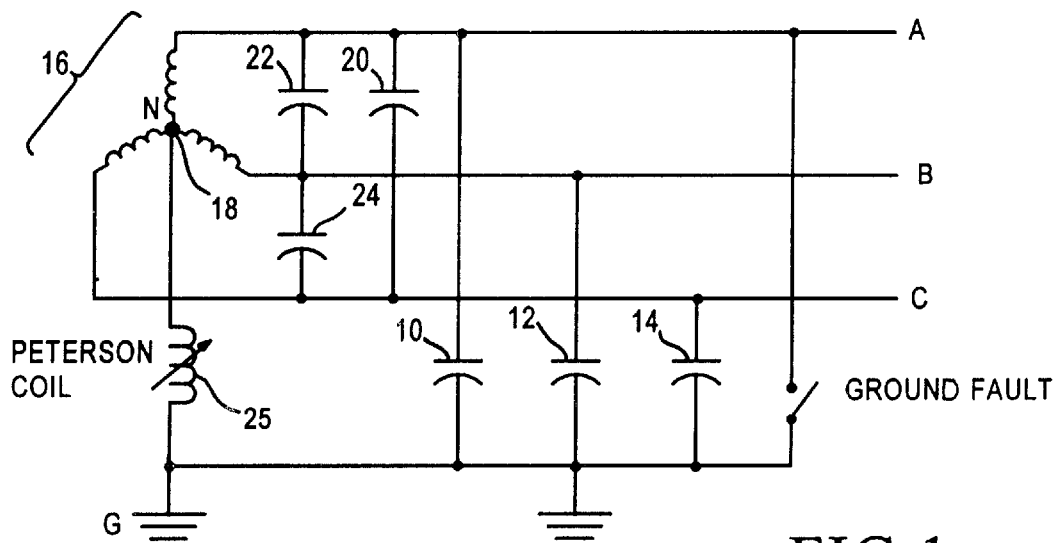
FIG. 1 is a simplified drawing of a power system utilizing a Petersen coil for intentional system grounding.

A simplified compensated network using a Petersen coil is shown in FIG. 1. It includes the secondary winding of a Wye-connected transformer and a three-phase power line with phases A, B and C. The system capacitance is represented between the A phase line and ground at 10, between the B phase line and ground at 12, and between the c phase line and ground at 14. The system power transformer secondary winding representation is shown generally at 16, extending between each of the phase lines and neutral, which is referenced at 18.

System phase-phase capacitance is also shown between the A phase and the C phase lines at 20, between the A phase and the B phase lines at 22, and between the B phase and the C phase lines at 24. The Petersen coil inductance 25 is connected between neutral 18 and ground 19. The inductance of the Petersen coil is adjustable so as to match the system zero-sequence line-ground capacitance. In this resonant system, the loads on the power line are connected phase-to-phase.

In modern installations, the Petersen coil is a moving core reactor having a control system to move the core, thus providing close to a 100 percent tuning capability for all operating conditions of the resonant power system. Resonant grounded power distribution systems (also known as compensated power distribution networks) have the advantage that ground fault current resulting from a phase-to-ground fault condition is reduced to approximately 3–10 percent relative to that of ungrounded systems. In such compensated power distribution systems, this low ground fault current permits the utility to continue to operate the faulted portion of the line even during a sustained ground fault. Communication networks served by such a power system are also not disrupted by the presence of a ground fault.

It is known that transient faults represent approximately 80 percent of all ground faults, and further, that ground faults self-extinguish in about 80 percent of all transient ground faults from overhead line systems having resonant grounding. Hence, in resonant grounded systems, at least 60 percent of all ground faults in overhead lines self-clear, i.e. no breaker or recloser action is required to clear the fault.

Even though a substantial number of ground faults self-clear in compensated power distribution systems, there are still a certain percentage of faults which do not self clear, and which therefore should be detected, even though, because the fault current is small, they may not present any immediate human hazard or threat to system condition or operation. Typically, this small fault current will be on the level of 1–90 amps. The small fault current, however, does present a significant challenge to detect, particularly for high resistance ground faults, which decrease the fault current even more.

A number of different fault detection methods have been used in the past for compensated power distribution networks, i.e. those using a Petersen coil. One such method is referred to as the Wattmetric method. The Wattmetric method has been in use for many years; it is simple, secure and dependable, but it is limited to detecting relatively low resistance ground faults. Typically a low resistance ground fault is 0–5000 ohms. Although this can vary depending on system configuration. The Wattmetric method has limited sensitivity relative to high resistance faults (generally greater than 5.000 ohms again depending on system configuration).

The Wattmetric method uses the real part of the product of the zero sequence voltage and zero sequence current from the power line and compares this value against positive and negative thresholds. If the product is less than the negative threshold, a forward fault is indicated, while a product which is greater than the positive threshold indicates a reverse fault. The Wattmetric approach, however, is limited to detecting low resistance ground faults. It does not have the required sensitivity to accurately detect high resistance ground faults, such as might occur in a phase line falling against a tree or pole.

An alternative to the Wattmetric method is the admittance method, in which changes in zero sequence admittance on all the substation feeder lines due to a ground fault are determined and compared. The feeder with the greatest change in the magnitude of admittance is the faulted feeder. The determination of admittance is accomplished by pre fault short-term detuning of the Petersen coil, which results in a detuning of the power system to measure the zero sequence admittance. While the admittance method has the desired sensitivity to detect high resistance ground faults, admittance information for all the feeders as well as control of Petersen coil tuning is required. This method is only appropriate for centralized systems installed in the distribution substation itself, and is hence both inconvenient and expensive.

A variation of the admittance method, known as DESIR, for Selected Detection Based on Residual Currents, uses a phasor comparison of the residual currents of the feeders, or their incremental values. This approach, however, also has the disadvantages of requiring information from all the feeders. Other methods include what is known as DDA (Differential Protection Based on Phase-Ground Admittances), which also requires control over tuning of the Petersen coil, and various harmonic-based methods which require the expense of flux-summation type current transformers (CTs) and further require that the system zero sequence capacitance be significantly greater than that of the protected feeder.

There are other relevant fault detection methods, but they either require information from all of the feeder lines in the substation, control over tuning of the Petersen coil, or flux summation CTs, or they do not have the necessary sensitivity to detect high resistance ground faults.

The present invention, however, is simple and practical and yet has the required sensitivity to detect high resistance ground faults in compensated power distribution networks. The system of the present invention is suitable for stand-alone devices which can be located at any point in a distribution network. One typical application is in the control unit of an automatic recloser on a feeder line.

The system of the present invention compares a calculated value of zero sequence conductance of the protective feeder against positive and negative threshold values to determine the existence of a forward or reverse ground fault on the feeder. Only information from the protected feeder is necessary and control of the Petersen coil is not necessary.

Figure 2:
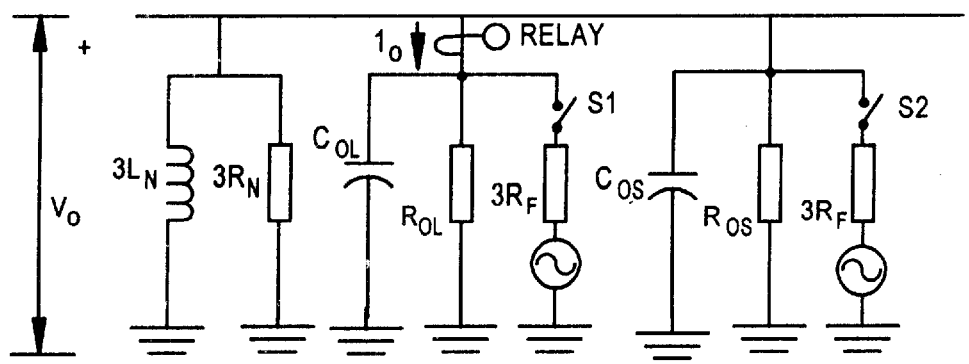
FIG. 2 is a drawing of a zero-sequence network representation of a compensated power distribution network.

FIG. 2 shows the zero sequence network representation for a balanced system. Any system imbalance is disregarded. The zero sequence current $I_0$ for forward and reverse faults are as follows:

$$\vec{I}_O = -\vec{V}_O \left[ \left( \frac{1}{R_{OS}} + \frac{1}{3R_N} \right) + j \left( \omega C_{OS} - \frac{1}{3\omega L_N} \right) \right] \quad \text{(Forward Fault)} \quad (1)$$

$$I_O = V_O \left( \frac{1}{R_{OL}} + j\omega C_{OL} \right) \quad \text{(Reverse Fault)} \quad (2)$$

Referring to FIG. 2:

$R_{OS}$=Source zero sequence resistance
$R_N$=Parallel equivalent resistance of Petersen coil
$C_{OS}$=Source zero sequence capacitance
$\omega = 2\pi\lambda$
$\lambda$=System frequency
$L_N$=Parallel equivalent inductance of Petersen coil
$C_{OL}$=Protected line zerosequence capacitance
$R_{OL}$=Protected line zerosequence resistance Equations 1 and 2 can then be used to calculate the apparent zero sequence admittance $Y_O$ for forward and reverse faults.

$$\vec{Y}_O = \frac{\vec{I}_O}{\vec{V}_O} = -\left[ \left( \frac{1}{R_{OS}} + \frac{1}{3R_N} \right) + j \left( \omega C_{OS} - \frac{1}{3\omega L_N} \right) \right] \quad \text{(Forward Fault)} \quad (3)$$

$$\vec{Y}_O = \frac{\vec{I}_O}{\vec{V}_O} = \frac{1}{R_{OL}} + j\omega C_{OL} \quad \text{(Reverse Fault)} \quad (4)$$

Taking the real part of Equations 3 and 4, the conductance $G_O$ can be determined for both forward and reverse faults.

$$G_O = Re\left[\frac{\vec{I}_O}{\vec{V}_O}\right] = -\left(\frac{1}{R_{OS}} + \frac{1}{3R_N}\right) = -(G_{OS} + G_{ON}) \quad \text{(Forward Fault)} \quad (5)$$

$$G_O = Re\left[\frac{I_o}{V_O}\right] = \frac{1}{R_{OL}} = G_{OL} \quad \text{(Reverse Fault)} \quad (6)$$

In the above formulas, $G_{OL}=1/R_{OL}$, which is the zero sequence leakage conductance of the protected feeder, $G_{OS}=1/R_{OS}$, which is the equivalent zero sequence leakage conductance of the remaining feeders, and $G_{ON}=1/3R_N$, which the is zero sequence conductance corresponding to the parallel equivalent of the Petersen coil.

A conductance element is used in the present invention which responds to the real part of $I_O/V_O$ (zero sequence current $I_O$ and zero sequence voltage $V_O$). The resulting conductance $G_O$ is compared with positive and negative thresholds. If $G_O$ is more negative than the negative threshold value, a forward fault is indicated while if $G_O$ is larger than the positive threshold value, a reverse fault is indicated. The logic circuit making the determination for the embodiment described herein is shown in FIG. 3 and described in detail below.

While the above-described conductance determination system provides good results for balanced systems and for systems with low CT errors (such as those which use flux summation CTs), unbalanced systems and CT unbalances introduce errors and thus limit sensitivity. One solution is to determine conductance values incrementally, using incremental zero sequence current $\Delta I_O$ and incremental zero sequence voltage $\Delta V_O$ to calculate an incremental sequence conductance $\Delta G_O$. The incremental conductance value $\Delta G_O$ will be compared with the positive and negative thresholds to determine forward faults and reverse faults. Such an arrangement is not affected by system unbalance, and can be used for systems with conventional current transformers (as opposed to flux summation CTs).

A variation of the incremental conductance determination approach is an "adaptive" conductance determination arrangement, in which a present value of zero sequence conductance $G_{O(k)}$ and an adaptive reference value are used to determine an incremental $G_O$ value. The adaptive reference value is the conductance calculated a selected number of samples (n samples) before the present value, i.e. $G_{O(k-n)}$. The advantage of the adaptive conductance arrangement is that it results in the advantages of the incremental conductance method relative to system unbalance and CT configuration, but does not require calculating incremental values of zero sequence voltage and current values. Instead, it can use actual zero sequence current ($I_O$) and zero sequence voltage ($V_O$) values. The adaptive conductance approach is explained in detail below and shown in FIG. 3.

Figure 3:
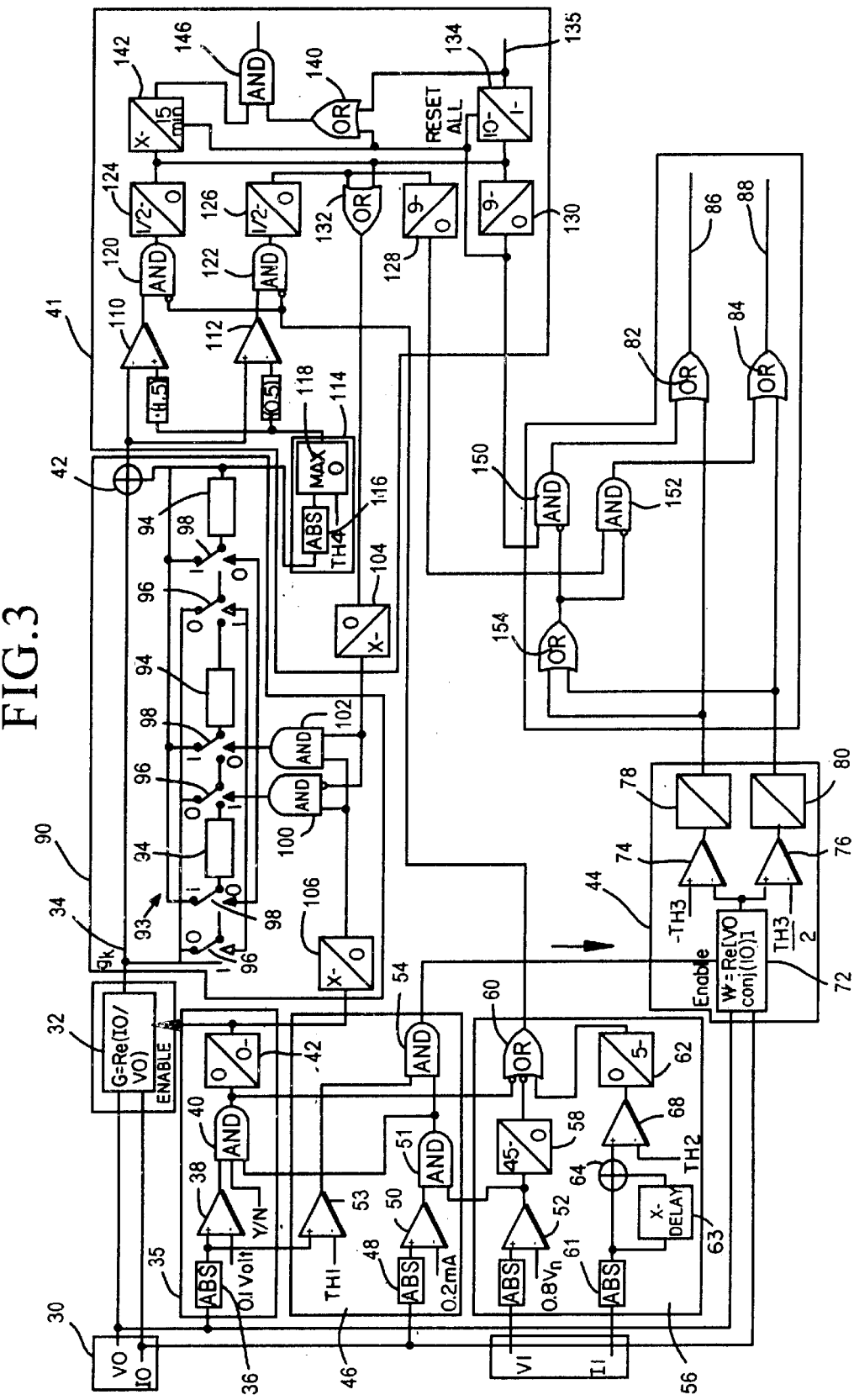
FIG. 3 is a schematic diagram showing the ground fault detection system of the present invention for use in a compensated power distribution network.

FIG. 3 shows the complete ground fault detection element of the present invention for use with compensated power distribution networks. The system of FIG. 3 includes the adaptive conductance arrangement. However, a system can operate using the basic conductance method without the adaptive feature, if desired.

The ground fault detection system of FIG. 3 combines a conventional Wattmetric determination circuit with a conductance determination arrangement. The Wattmetric circuit is enabled when a low resistance fault determination is to be made or under other specific operating conditions discussed below. High resistance faults are detected by the conductance determination circuit. The system also includes a number of supervising features which ensure that the system only operates under specified conditions.

Referring now to FIG. 3 in detail, two phasors, zero sequence voltage $V_O$ and zero sequence voltage $I_O$, are determined at element 30. In the embodiment shown, $V_O$ is calculated from the measured phase ground voltages as follows: $V_O=\frac{1}{3}(V_A+V_B+V_C)$, where $V_A$, $V_B$ and $V_B$ are the phase voltages on lines A, B and C, respectively (FIG. 1), measured in conventional fashion from the 3 phase power line. The zero sequence current is defined as $I_O=\frac{1}{3}(I_A+I_B+I_C)$, where $I_A$, $I_B$, and $I_C$ are the phase currents for lines A, B and C, respectively, again measured in conventional fashion from the power line.

The quantities $V_O$ and $I_O$ are applied to several different portions of the circuit of FIG. 3. First, the $V_O$ and $I_O$ calculated quantities are applied to a conventional conductance calculation element 32. The output of the conductance calculation element is shown as $G_k$ at point 34 in the circuit. The detailed explanation of the conductance evaluation using $G_k$ values is set forth below.

The $V_O$ quantity is applied as an input to a conductance calculation enabling circuit 35. $V_O$ is first applied to an absolute value circuit 36, the output of which is applied to the positive input of a comparator 38, which compares the absolute value with a threshold value, which in the embodiment shown is 0.1 volt. This comparison assures that the zero sequence voltage has a sufficient magnitude that its angle can be relied upon. The output of comparator 38 is applied as one input to AND gate 40. A second input to AND gate 40 is from a user-operated switch indicating whether the user desires the conductance calculation element 32 to be enabled or not (Yes or No). Typically, that input signal will be enabled (high) when high ground fault resistance sensitivity is desired. If the user does not want the conductance calculation element to be enabled, the input is set low by the user. The third input to AND gate 40 is from AND gate 51, the function of which is described in detail below.

When all the inputs to AND gate 40 are high, its output will also be high, which triggers timer 42, which is an instantaneous pickup, time-delayed dropout timer. Timer 42, being instantaneous pickup, will begin timing upon the output of AND gate 40 going high. The time delay dropout of timer 42 is six cycles, so that the output of timer 42 will not go low, after it has been enabled, until six power system cycles go by during which the input signal remains low. An appropriate range could be 1–30 cycles. The delayed dropout is important, to permit the conductance circuit to continue operating during times where $V_0$ may temporarily drop below the 0.1 volt threshold, such as after the inception of a fault. Otherwise, a delay in a directional declaration of a fault might result.

The $I_0$ quantity is applied to a supervisory circuit 44 for a Wattmetric.circuit which is shown generally at 44. The absolute value of $I_0$ is obtained at 48 and applied to the positive input of a comparator 50. The other input to comparator 50 is a threshold value of 0.2 mA secondary. Thus the output of comparator 50 is high if $I_0$ is greater than 0.2 mA. A 0.2 mA threshold is the minimum sensitivity of the Wattmetric and conductance elements 44 and 32, respectively. It is possible that this sensitivity could be lowered with future technical advances. The output of comparator 50 is applied to one input of AND gate 51. The other input to AND gate 51 is from comparator 52. The inputs to comparator 52 include the absolute value of the positive sequence voltage $V_1$ and a threshold value of 0.8 $V_{NOM}$, where $V_{NOM}$ is the nominal voltage of 120v (line neutral).

The positive sequence voltage $V_1$ is calculated as follows: $V_1$ is equal to $\frac{1}{3}(V_A + a \cdot V_B + a^2 \cdot V_C)$ where a is a phasor value of $1\angle 120°$. By requiring that $V_1$ be greater than 0.8 $V_{nom}$, the operation of the conductance circuit is restricted to when the protected feeder is energized. The value of 0.8 may be changed within the spirit of the invention. When the outputs of comparators 50 and 52 are both high, the output of AND gate 51 will be high. When the output of AND gate 51 and comparator 53 are both high (comparator 53 is high when the absolute value of $V_0$ is greater than a threshold value TH1, which typically might be 20% of the nominal voltage, high enough to prevent the Wattmetric determination circuit from operating during normal load operations), then the output of AND gate 54 is high, which is the enabling signal for the Wattmetric circuit 44.

The circuit referenced at 56 is another supervisory circuit for the operation of the conductance evaluation circuit portion 91 of FIG. 3. Supervisory circuit 56 is responsive to positive sequence voltage ($V_1$) and positive sequence current ($I_1$) quantities. The output of comparator 52 (discussed above) is applied to a time-delayed pickup, instantaneous dropout timer 58. The output of timer 58 is high when the output of comparator 52 has been high for 45 consecutive power system cycles, i.e. when the positive sequence voltage has been greater than 0.8 nominal voltage for 45 cycles. This in essence delays operation of the conductance evaluation circuit, ensuring that the conductance evaluation circuit cannot provide an output until 45 cycles after the protected line is first energized. A range could be 1–60 cycles. During this initial 45 cycle period, the Wattmetric circuit is used to make fault determinations.

The output of timer 58 is applied to one inverting input of OR gate 60. The output of AND gate 40 in supervisory circuit 36 is also applied to an inverting input of OR gate 60. The third input to OR gate 60 is the output of timer 62 in supervisory circuit 56. The absolute value of the positive sequence current $I_1$ from element 61 is applied to the positive input of a difference determination element 64. Applied to the negative input of difference determination element 64 is the positive sequence current $I_1$ of 15 cycles previous, from delay element 63. The 15 cycle delay can be varied, either somewhat greater or lesser. A range is 5–30 cycles. The $\Delta I_1$ difference value from element 64 is applied to the positive input of comparator 68.

The other input to comparator 68 is a threshold value TH2 which in the embodiment shown is 0.2 mA secondary or greater. A high output from comparator 68 will trigger an instantaneous pickup, 5-cycle delayed-dropout timer 62. The output of timer 62 ensures that the output of timer 62 remains high after the timer has been initiated for at least 5 cycles after the output of comparator 68 goes low.

The output of OR gate 60 is applied to the conductance evaluation circuit 91 which follows the conductance determination circuit 90 and basically disables any output from the conductance determination circuit in the event that the positive sequence voltage and the positive sequence current values are such that the output of OR gate 60 is high (a logic one), meaning that either the output from AND gate 40 or timer 58 is low or the output from timer 62 is high.

As indicated above, there are circumstances under which the conductance determination circuit does not operate, but instead the Wattmetric circuit functions. This is generally for low resistance faults.

The Wattmetric element 72 is responsive to zero sequence voltage and current values from element 30. The calculation performed by the Wattmetric element is: $W = R_e[V_0 \cdot I_0^*]$, where $R_e$ is the real operator and the * indicates the complex conjugant operator. As indicated above, this calculation is not performed unless the output from AND gate 54 is high. The output of the Wattmetric element 72 is applied to the negative input of comparator 74 and the positive input of comparator 76. If the output of Wattmetric element 72 is less than the negative threshold value $T_3$ at the positive input thereto, the output of comparator 74 is high. This indicates a forward fault. If the output of Wattmetric element 72 is greater than the positive threshold value T3/2 applied to the negative input to comparator 76, the output of comparator 76 is high, which indicates a reverse fault.

For security against false directional declarations from the Wattmetric circuit 44, the outputs of comparators 74 and 76 are applied, respectively, to time-delay pickup timers 78 and 80. This provides protection after a selected number of cycles, e.g. 5 cycles, so that a fault is not actually declared until the output of comparator 74 or 76 has been high for a selected number of power system cycles.

The outputs of timers 78 and 80 are applied, respectively, to OR gates 82 and 84, the outputs of which provide actual ground fault declarations on output lines 86 and 88, respectively. These signals may then be used to trip an appropriate circuit breaker on the protected feeder.

The adaptive conductance determination circuit is shown at 90. In circuit 90, conductance values (G) from conductance calculation element 32 are applied to the positive input of a difference determination circuit 92, which produces an "adaptive" $\Delta G$ value. The negative input of difference determination circuit 92 receives the value of the conductance 15 power cycles previous, i.e. 60 conductance values previously since conductance determinations are made, in the embodiment shown, 4 times per power system cycle. The fifteen power cycle difference (an appropriate range is 5–30 cycles) used in the embodiment shown can be varied, using either a larger or smaller number.

The 15-cycle (60 conductance values) difference is provided by a memory buffer structure 93. The arrangement is designed to prevent the memory from being corrupted by fault quantities, as will be clarified below. The buffer memory 93 includes a total of 60 individual memory elements 94—94 through which the values of conductance G are sequentially moved, as each new conductance determination is made.

The movement of the conductance values through the memory elements 94—94 is controlled by buffer switches 96 and 98 for each memory element. Each memory element has switches 96 and 98 as shown in FIG. 3. The position of all the buffer switches 96 and 98 is controlled, respectively, by the output of AND gates 100 and 102. If there has been no previous recognition of a forward fault being present, the output of timer 104 is low. This low output signal results in the output of AND gate 102 being low and results in the output of AND gate 100 being high if the output of timer 106 is high. Timer 106 is a time-delayed pickup timer. In the embodiment shown, it is responsive to timer 42 but does not produce a high output until a selected number of cycles has gone by following the calculation element 32 being enabled. In the embodiment shown, the selected number of cycles is 15, but this could be varied, e.g. within a range of 5–30 cycles.

The conductance determination circuit 90 includes a buffer memory structure 93. The buffer memory 93 has three possible operational states. In the first state, the output of timer 106 is a logical zero, indicating that the conductance calculation element 32 has not been enabled for at least 15 consecutive power system cycles. In this state, the outputs of both AND gates 100 and 102 will be low. Both buffer switches 96 and 98 will then move to their zero position. In this position, every cell in buffer memory 93 is directly connected to the output of element 32 and is updated with the most recent conductance value $G_k$ from conductance calculating element 32, as soon as that element is enabled. Thus, all elements in buffer memory 93 remain in essence fully charged, with the most recent conductance value. There will thus be a value immediately present at the negative input of element 92 so that the relay does not have to wait for the buffer memory to charge before it is capable of producing an output at the start of a fault.

In the second operational state of the memory buffer circuit 93, the output of timer 106 is high, while the output of timer 104 remains low, indicating that there has been no current fault indication for the required number of power system cycles. In this operational state, the output of AND gate 100 is high, which moves buffer switch 96 to its one position, and the output of AND gate 102 is low, so that the buffer switch 98 is in its zero position. In this arrangement, as can be seen in FIG. 3, the individual buffer memory cells 94—94 are connected in series between the output of conductance element 32 and difference determination element 92.

The most recent conductance value $G_k$ from element 32 is applied to the first buffer memory cell 94, while the value that was previously in that first memory cell is moved sequentially to the second memory cell and so on, until all 60 memory cells are updated in the buffer memory. The output of the last buffer memory cell in the series sequence is applied to the negative input of difference determinator element 92. The movement of conductance values occurs each time (4 times per power cycle) a conductance determination is made by element 32.

In the third operational state, the output of timer 104 is high, indicating that a fault has been declared for at least a ½ cycle or there has been a fault declaration within the last 15 cycles. The output of time 106 is also high. This results in the output of AND gate 102 being high and the output of AND gate 100 is being low. Buffer switch 96 is in the zero position and buffer switch 98 is in the one position. In this arrangement, all of the buffer memory cells 94—94 are filled with the value in the last memory cell (the one closest to difference element 92). This prevents the buffer memory from being corrupted by the fault, allowing correct directional output after the fault has occurred.

The output ΔG of the adaptive difference element 92 ΔG is applied to conductance evaluation circuit 91 which makes fault determinations and then processes those signals through additional logic to provide additional fault-related information. In circuit 9, the output from element 92 is applied to the negative input of comparator 110 and the positive input of comparator 112. The output of comparator 110 will be high for forward faults, while the output for comparator 112 will be high for reverse faults. For the output of comparator 110 to be high, the difference conductance value from element 92 must be more negative than the negative threshold value applied to the positive input to the comparator. The threshold value to comparator 110 is the output of logic circuit 114 multiplied by a value of –1.5. The input to logic circuit 114 is from the last memory cell in the 60 cell buffer memory 93.

The absolute value of that last conductance value is determined at 116 and is applied to a "maximum" value determination circuit 118. The maximum value determination circuit 118 maintains the maximum conductance value provided by element 32. There is a minimum threshold TH4 for circuit 118. In the embodiment shown, it is approximately 0.5 $\mu$siemens (conductive units). Hence, a high output from comparator 110 requires that the ΔG value is less (more negative) than the maximum value of the conductance from the buffer memory multiplied by –1.5. The threshold value for comparator 112 is the ΔG max value from circuit 118 times 0.5. ΔG at the positive input of comparator 112 must be greater than this value for a reverse fault to be declared.

The output of comparator 110 is applied to AND gate 120. The other input to AND gate 120 is an inverting input from the output of OR gate 60. A high output of AND gate 120, indicating a forward fault, can occur when (1) 45 cycles has elapsed following energization of the line (timer 58); (2) no line switching has occurred during the past five cycles (timer 62); and (3) there is a high signal from AND gate 40, which indicates that the user has in fact selected conductance based fault determination, the zero sequence current is greater than 0.2 mA secondary and the zero sequence voltage is greater than 0.1 volt secondary. Under those conditions, AND gate 120 is enabled, (and will produce a high output of the output of comparator 110 is high) as is AND gate 122, which is for reverse faults, which responds to the output of comparator 112.

The outputs of AND gates 120 and 122 are applied to timers 124 and 126, respectively. The output of timers 124 and 126 are one-half cycle pickup, instantaneous dropout timers. The output of these timers are applied to timers 130 and 128 respectively. Timers 128 and 130 are time-delayed pickup, instantaneous dropout timers having a 9-cycle pickup delay in the embodiment shown. Timers 124, 126, 128 and 130 are designed to ascertain self-extinguishing faults on the basis that the forward or reverse faults are declared for a greater than one-half cycle, but less than 9½ cycles (the fault self-extinguishes before 9½ cycles occurs). The selection of one-half cycle as the lower limit can be varied, as can the 9½ cycle upper limit. A range could be ½–30 cycles.

The information from this portion of circuit 91 provides the user with a measure of system performance in identifying the number of self-extinguishing faults as well as the number of "permanent" faults which produce system output signals on lines 86 and 88. The output of timer 124 is high after one-half cycle of high output from AND gate 120. Besides being applied to timer 130, it is also applied to OR gate 132, which triggers timer 104, which in turn controls AND gates 100 and 102, as discussed above. OR gate 132 is also responsive to a reverse fault indication from timer 126.

The output of timer 124 is also applied to a timer 134, which is a rising edge initiated, 10-cycle timer. Timer 134 normally has a low output. Once timer 134 is triggered by an output from timer 124, its output continues to remain low for the next 10 cycles. If timer 134 is not reset by an output from timer 130 during the 10-cycle period, the output of timer 134 (line 135) will go high for one cycle. This is an indication of a self extinguished fault (only for forward faults). The total number of such faults can be accumulated in a counter. The output of timer 134 is also applied to one input of OR gate 140, the output of which is applied to AND gate 146, as discussed in more detail below.

The output of timer 124 is also applied as an input to a timer 142, which provides a restriking fault indication. Timer 142 is a rising edge initiated, time-delayed pickup and dropout timer. The pickup time in the embodiment shown is 15 cycles, which can be varied, while the dropout time is 15 minutes, which also can be varied. Timer 142 asserts an output (goes high) at a point 15 cycles after an input trigger from timer, 124, indicative of a forward fault. The output remains asserted for 15 minutes if the fault is not permanent (i.e. the fault lasts for less than 9½ cycles). This output is applied to AND gate 146. The next time a forward fault is asserted, producing a one cycle output from timer 134, the output of AND gate 146 will go high, indicating a restriking fault.

An output from timer 130, which occurs when the fault is permanent (greater than 9½ cycles) resets both timers 134 and 142, preventing re-striking or transient indications since the output to AND gate 146 from timer 142 will go low. The output from AND gate 146 can be used to increment a non-volatile counter (not shown), which indicates to the user the total number of forward direction restriking ground faults.

The outputs of timers 130 and 128, which go high upon the occurrence of "permanent" (non self-extinguishing) forward and reverse ground faults, respectively, are applied as inputs to AND gates 150 and 152. The other inputs to AND gates 150 and 152 are inverting inputs from OR gate 154. When there are no outputs from Wattmetric circuit 44 (timers 78 and 80) such that the output of OR gate 154 is low, AND gates 150 or 152 are enabled and can go high, depending upon the outputs of timers 128 and 130. The outputs from AND gates 150 and 152 are then applied to OR gates 82 and 84, which provide outputs on lines 86 and 88, indicating a forward or reverse fault. OR gates 82 and 84 are thus responsive to indications of forward and reverse faults from either the Wattmetric circuit 44 or the conductance calculation circuit. The outputs on lines 86 and 88 can be used to trip circuit breakers to interrupt the power on the protected line.

Accordingly, a stand-alone, sensitive ground fault detection system has been disclosed which is useful with a compensated power distribution network. The ground fault detection system can be used with a recloser to protect an individual feeder line. It includes a conductance calculation circuit which is sufficiently sensitive to provide accurate determinations of high-resistance ground faults while using only information from the protected feeder, without having to control the Petersen coil. The embodiment shown also includes a Wattmetric circuit which can provide fault determination information for ground faults when a sufficient ground fault current and voltage for that circuit.

The embodiment shown is described in terms of conductance and Wattmetric calculations, using real values of conductance and Watts. It should be understood, however, that the very same principles can be applied to the inverse characteristics thereof, namely, resistance and watts. The term "conductance-related value" covers both conductive and resistance applications.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A system for detecting ground faults in a compensated distribution network, comprising:
    means for determining the zero sequence voltage ($V_O$) and zero sequence current ($I_O$) on a power line;
    a calculation system for calculating therefrom a conductance or resistance value from the real parts of said zero sequence voltage and zero sequence current;
    circuitry for enabling the operation of the calculating system for only preselected power line conditions; and
    means for comparing the conductance or resistance value against a first threshold value to determine a forward fault and a second threshold value to determine a reverse fault.

2. A system of claim 1, wherein the conductance or resistance values are adaptive conductance or resistance values, comprising the difference between a most-recent conductance or resistance value and a conductance or resistance value determined at a selected previous time.

3. A system of claim 2, wherein the conductance or resistance value of said previous time is provided by a series of buffer memory elements having temporarily stored therein conductance or resistance values determined in sequence between the most recent conductance or resistance value and the conductance or resistance value determined at said previous time.

4. A system of claim 3, including means for controlling the buffer memory elements and the shift of conductance or resistance values therebetween, such that in a pre-fault power system condition, the conductance or resistance values move sequentially between the buffer memory elements upon each new determination of conductance or resistance value.

5. A system of claim 4, wherein said controlling means operates to load all of the buffer memory elements with the most recent conductance or resistance value following initial enabling of the calculating system.

6. A system of claim 4, wherein said controlling means operates to load all of the buffer memory elements with said previous conductance or resistance value and for preventing shifting movement of the conductance or resistance values through the buffer memory elements following determination of a fault.

7. A system of claim 2, wherein said previous time is within the range of 5 cycles to 30 cycles prior to the most recent time.

8. A system of claim 1, including a delay element for delaying a fault signal for a selected number of cycles following determination of a fault to permit the fault to self-extinguish during said selected number of cycles.

9. A system of claim 8, wherein the delay is within the range of ½–30 power system cycles.

10. A system of claim 8, including a timer element for providing an indication of a re-striking fault when another fault occurs within a selected period of time following occurrence of a self-extinguishing fault.

11. A system of claim 10, wherein the selected period of time is approximately 15 minutes.

12. A system of claim 8, wherein the delay element provides an indication of a fault which self extinguishes and wherein the system includes a counter element for accumulating the number of times self-extinguishing of faults occurs.

13. A system of claim 1, wherein the enabling circuit requires that the zero sequence voltage be at least 0.1 volts secondary and the zero sequence current be at least 0.2 mA secondary, and wherein a loss of an enable signal provided by the enabling circuit must continue for a selected number of power system cycles before the calculating system ceases to be enabled.

14. A system of claim 13, wherein the selected number of power system cycles is within the range of 1–30 cycles.

15. A system of claim 14, wherein said selected period of time is within the range of 1–60 cycles.

16. A system of claim 1, wherein the fault determinations are blocked for a preselected period of time following a one selected amount of change in the magnitude of positive sequence current on the power line.

17. A system of claim 16, wherein said selected period of time is within the range of 1–60 power system cycles and said selected charge in the magnitude of the positive sequence current is within the range of 1–90 amperes primary.

18. A system of claim 1, wherein the fault determinations are blocked for a selected period of time following energization of the power line.

19. A system of claim 1, wherein the calculating system is not enabled unless the value of the positive sequence voltage ($V_1$) is higher than 0.8 times the nominal voltage.

20. A system of claim 1, wherein the positive and negative threshold values are, respectively, the maximum value of previous conductance or resistance values multiplied by selected scaler values.

21. A system of claim 20, wherein the scaler values are −1.5 for forward faults and 0.5 for reverse faults.

22. A system of claim 1, including a Wattmetric calculation circuit for detecting low resistance faults, the Wattmetric calculation circuit responding to the real part of the product of zero sequence voltage ($V_0$) and zero sequence current ($I_0$), the resulting real portion being compared against positive and negative threshold values to determine forward and reverse faults.

23. A system of claim 22, wherein the Wattmetric calculation circuit responds to the imaginary part of the product of the zero sequence voltage ($V_0$) and the zero sequence current ($I_0$).

24. A system of claim 23, including means for preventing action by the comparing means if the Wattmetric circuit is enabled.

25. A system of claim 24, including means for preventing action by the comparing means if the Wattmetric circuit is enabled.

26. A method for detecting ground faults in a compensated power distribution network, comprising the steps of:

determining the zero sequence voltage ($V_0$) and zero sequence current ($I_0$) on a power line;

calculating a conductance or resistance value from the real parts of said zero sequence voltage and zero sequence current;

enabling the operation of the calculating step for selected power line conditions, to assist in insuring the accuracy of a ground fault determination; and comparing the conductance or resistance value against a first threshold value to determine a forward fault and a second threshold value to determine a reverse fault.

27. A method of claim 26, wherein the conductance or resistance values are adaptive conductance or resistance values, comprising the difference between a most-recent conductance or resistance value and a conductance or resistance value determined at a selected previous time.

28. A method of claim 27, wherein the conductance or resistance value at said previous time is provided by a series of buffer memory elements having temporarily stored therein conductance or resistance values determined in sequence between the most recent conductance or resistance value and the conductance or resistance value determined at said previous time.

29. A method of claim 26, including the step of delaying a fault signal for a selected number of cycles following determination of a fault, to permit the fault to self-extinguish during said selected number of cycles.

30. A method of claim 29, including the step of providing an indication of a re-striking fault when another fault occurs within a selected period of time following occurrence of a self-extinguishing fault.

31. A method of claim 26, including the step of blocking the fault determining step for a selected period of time following a preselected amount of change in the magnitude of positive sequence current on the power line.

* * * * *